(No Model.)  2 Sheets—Sheet 2.

J. EMERSON.
WATER WHEEL TESTING APPARATUS.

No. 530,513.  Patented Dec. 11, 1894.

Witnesses
Geo. T. Warwick
K. I. Clemons

Inventor,
James Emerson,
by Chapin & Co.
Attys.

UNITED STATES PATENT OFFICE.

JAMES EMERSON, OF WILLIMANSETT, MASSACHUSETTS.

WATER-WHEEL-TESTING APPARATUS.

SPECIFICATION forming part of Letters Patent No. 530,513, dated December 11, 1894.

Application filed July 23, 1894. Serial No. 518,308. (No model.)

*To all whom it may concern:*

Be it known that I, JAMES EMERSON, a citizen of the United States, residing at Willimansett, in the county of Hampden and State of Massachusetts, have invented new and useful Improvements in Water-Wheel-Testing Apparatus, of which the following is a specification.

It is, as well known to hydraulic engineers, in figuring the percentage of efficiency of a given turbine or water wheel, necessary to have determined accurately the proportional part of its whole opening of the speed gate which admits the water to the wheel, in conjunction with other data as the head of water acting on the wheel, the number of revolutions of the wheel per minute and the power actually developed by the wheel dynamometrically determined; and the present invention relates to measuring gate-registers for turbine water wheels, the object being to provide improved devices, intermediate of the main or power shaft of a turbine or other water wheel and the gate thereof and in a manner operatively governed by the position of the gate, which provide means for accurately determining the average percentage of gate-opening during the time the wheel has been running.

The invention consists in the combination with the water-wheel-shaft, and the gate, of a counter, a wheel connected with the counter, a device for driving the wheel having a given working thrust relative thereto, and mechanism operatively connected to the water-wheel-shaft for operating the said driving device, a shield adapted to have a movement of interposition between the driving device and the part of the wheel engaged thereby, and a medium of connection between the gate and shield whereby the position of the shield relatively to the counter-driving-wheel may be variable according to the position of the gate; and in certain particular constructions and combinations of parts, all substantially as will hereinafter fully appear and be set forth in the claims.

Figure 1:
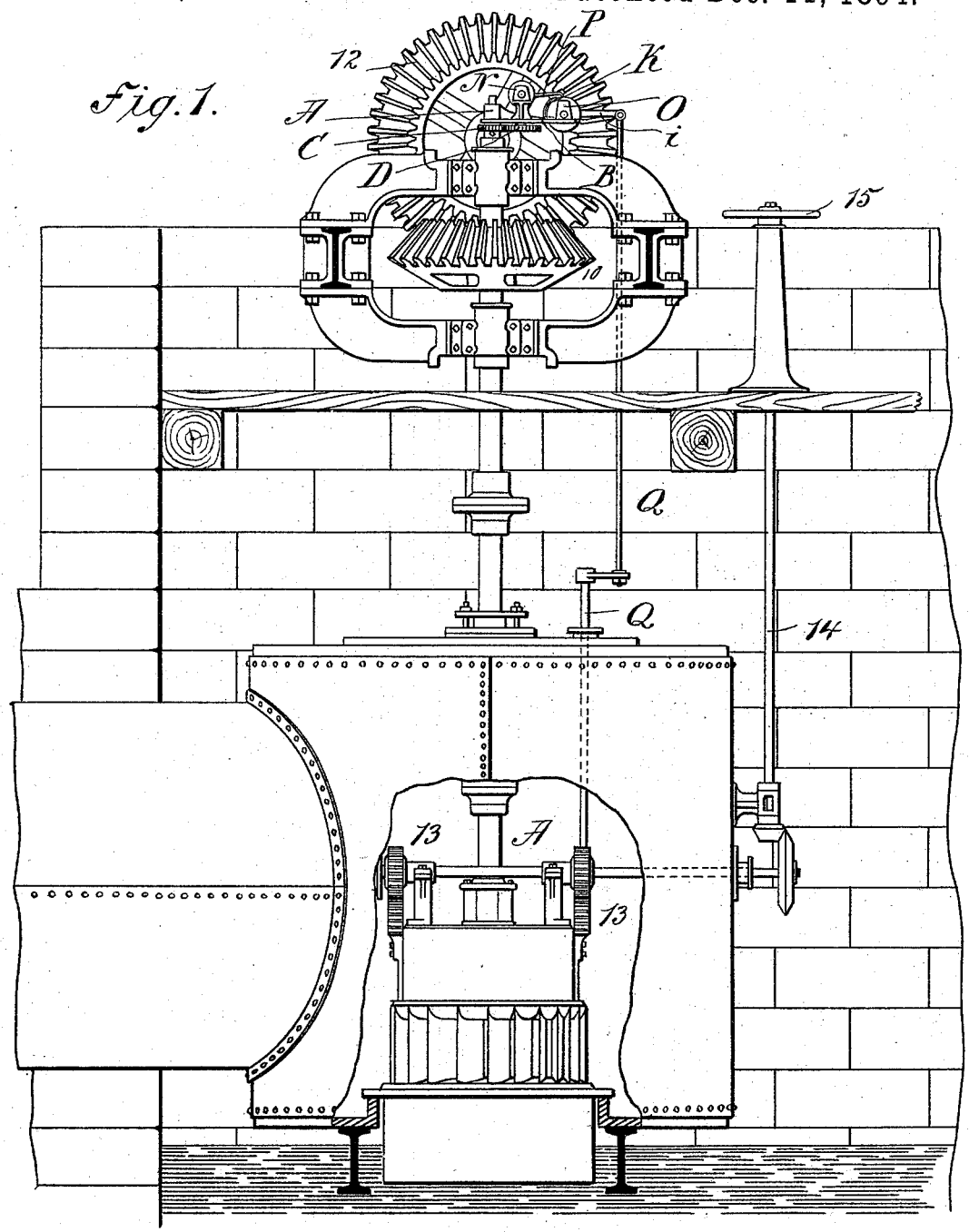
Figure 2:
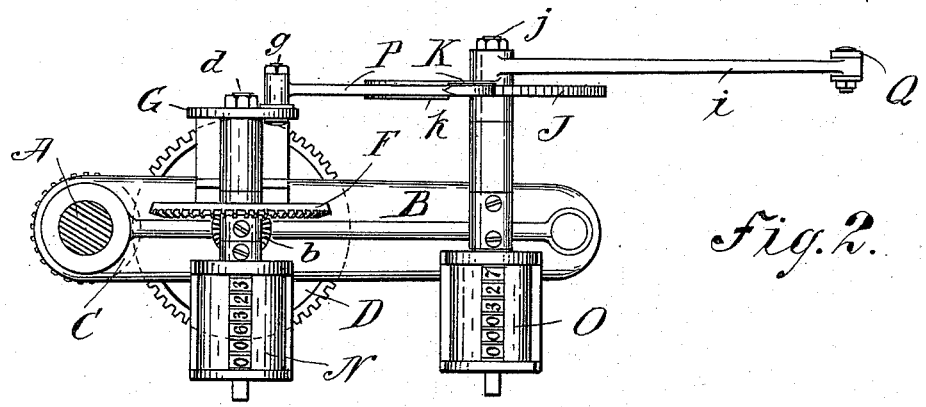
Figure 3:
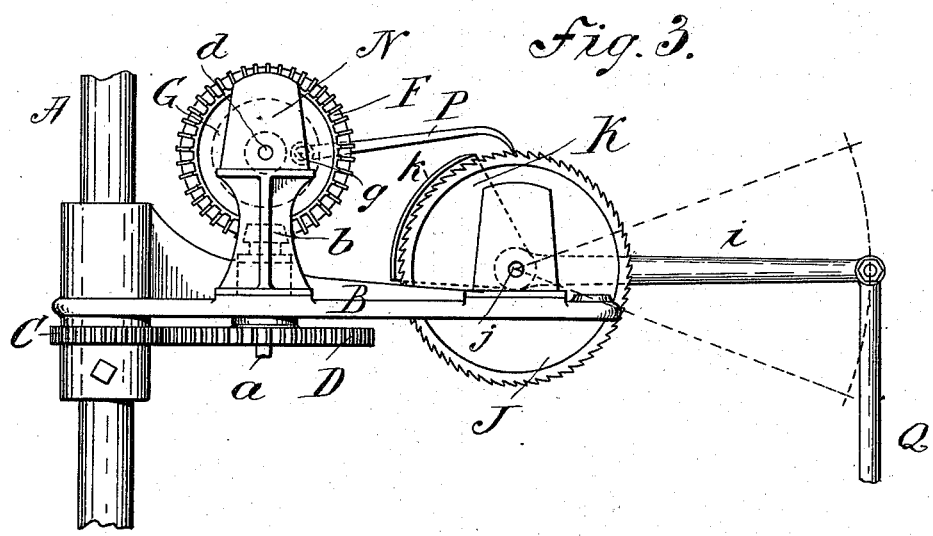

In the drawings forming part of this specification, Figure 1 is a side elevation of a turbine wheel and its geared connections with power-transmitting devices, together with the usual hand-operating connections with the gate thereof, to which my improvements are applied, this figure showing a part of the usual wheel-pit, and of the flume in which the wheel is set. Fig. 2 is a plan view showing the novel devices, Fig. 3 being a front elevation of the same drawn on a larger scale than are the same parts which are shown in Fig. 1.

In the drawings, A represents the turbine wheel shaft and 10 and 12 are the usual gears for the transmission of the power of the wheel. The turbine has the gate, as usual, which may be completely closed to prevent the passage of any water through the wheel, or which may be partially or fully opened.

13, 14, represent the gearing and shaft connections connected with, and extending from, the gate to the top of the flume for operating the gate by turning the hand wheel, 15, as usual; and Q represents a rod which is connected with the gate and moves up and down as one therewith.

Now upon the turbine shaft, A, above its gear, 10, is a spur-gear, C, which meshes into a spur-gear, D, the arbor, $a$, of which is suitably journaled in the stationary bed plate, or support B. On the said upright arbor, $a$, for gear, D, is a bevel pinion, $b$, working into the bevel gear, F, the horizontal arbor, $d$, of which is connected to the actuating shaft of the counter, N; and the gearing and connections between the turbine-shaft and the arbor of the counter, N, are, preferably and simply, such that the counter counts one for every ten rotations of the turbine. On the said arbor which is connected with the counter, N, there is a disk, G, with a crank-pin, $g$, to which is connected, and by which is reciprocated, the pawl-rod, P, which actuates the ratchet-wheel, J, which preferably has some number of teeth equally divisible by ten, as two or more hundred so that the loss of a fraction of a tooth may be as small as possible. The thrust of the pawl-rod, P, covers, say, one-tenth of the circumference of the ratchet-wheel, J, so that ten full strokes of the pawl-rod occurring with every one hundred rotations of the turbine shaft, if in engagement with the ratchet-wheel all the while, will cause one complete rotation of the latter, and thereby count one on the counter, O, with which the arbor of the ratchet wheel, J, is operatively connected. Mounted to rock on the arbor $j$ of the ratchet-wheel, J, is a shield, K, with the lever-arm, $i$, to which the aforesaid rod, Q, which is movable with the gate, is connected. The shield, K, has the guard-lip, $k$, thereof to overlie the teeth of the ratchet-wheel adjacent the working tooth of the pawl-rod, and the arrangement of the ratchet-wheel, J, and its pawl, P, shield, K, and the gate with which the shield has a controlling connection, is such that when the gate is fully closed, the shield overlies the ratchet-wheel for a space corresponding to the whole thrust of the pawl-rod, P, that when the gate is fully open the shield has a position to leave clear the ratchet wheel for the entire space corresponding to the whole thrust of the pawl, and again, of course, any partial raising of the gate, places the shield to clear so much of the space at the edge of the ratchet wheel, fractional of the whole traverse of the pawl-rod, as the partial extent of gate raising is fractional of the maximum opening thereof.

Of course it will be understood that during a period of running for a trial of the turbine, the gate may have different positions which are more or less open,—the effective play of the pawl-rod while in engagement with the ratchet wheel to operate the counter, being always proportionate to the height of the gate. Now at the close of a trial, add a cipher to the sum shown by the counter, N, whereupon the number of revolutions of the turbine shaft will be given. Now add two ciphers to the number shown by the counter, O, and if the turbine has run with full gate during all the time of the trial the representations obtained from the two counters, N and O, will be the same; but if the gate has been but partially opened during all or any part of the time of the trial, then the showing made by the counter will be correspondingly less, and a division of the number derived from the counter, O, by the greater number of turbine rotations derived from the counter, N, will give the average percentage of gate opening during the trial in which time the counters, N, O, have been at work.

Having thus described my invention, what I claim, and desire to secure by Letters Patent, is—

1. In a water wheel testing apparatus, the combination with the water-wheel-shaft, and the gate, of a counter, a wheel connected with the counter, a device for driving the wheel having a given working thrust relative thereto, and mechanism operatively connected to the water-wheel-shaft for operating the said driving device, a shield adapted to have a movement of interposition between the driving device and the part of the wheel engaged thereby, and a medium of connection between the gate and shield whereby the position of the shield relatively to the counter-driving-wheel may be variable according to the position of the gate, substantially as and for the purpose set forth.

2. In a water-wheel testing apparatus, the combination with the water-wheel-shaft, and the gate, of a counter, a wheel connected with the counter, a device for driving the wheel having a given working thrust relative thereto, and mechanism operatively connected to the water-wheel-shaft for operating the said driving device, a shield adapted to have a movement of interposition between the driving device and the part of the wheel engaged thereby, a medium of connection between the gate and shield whereby the position of the shield relatively to the counter-driving-wheel may be variable according to the position of the gate, and a second counter operatively connected with the water-wheel-shaft for indicating the number of the rotations thereof, substantially as set forth.

3. In a water-wheel testing apparatus, the combination with the water-wheel-shaft and the gate, of the ratchet-wheel, J, with the shield movably mounted adjacent thereto and having the lever arm, a rod operatively connected with the gate and with said lever-arm, a rotatable shaft having a driving connection with the water-wheel-shaft, and having the eccentric pin on which is hung a pawl-rod which has its operation upon the said ratchet-wheel as permitted by the automatically adjusted position of the said shield, and and a counter operated by the rotations of the arbor of said ratchet-wheel, substantially as described.

4. In a water-wheel testing apparatus, the combination with the water-wheel-shaft and the gate-rod, of the gear, C, on the water-wheel-shaft, the counter, N, and a shaft, $d$, which operates it carrying a crank-pin and having a bevel-gear wheel, F, the shaft, $a$, with a bevel-pinion, $b$, in mesh with bevel-gear, F, and having the gear-wheel, D, working into the gear-wheel, C, the counter, O, and the shaft which operates it, having thereon the ratchet-wheel, J, the pivotally mounted shield, K, having the lever-arm, $i$, to which the gate-rod is connected, and the pawl-rod connected to said crank-pin and operating relative to the said shield and ratchet-wheel, substantially as and for the purposes set forth.

JAMES EMERSON.

Witnesses:
WM. S. BELLOWS,
K. I. CLEMONS.